United States Patent
Guthaus et al.

(10) Patent No.: US 8,966,427 B2
(45) Date of Patent: Feb. 24, 2015

(54) SYSTEMS AND METHODS FOR INTEGRATED CIRCUIT C4 BALL PLACEMENT

(71) Applicant: The Regents of the University of California, Oakland, CA (US)

(72) Inventors: Matthew Guthaus, Santa Cruz, CA (US); Sheldon Logan, Santa Cruz, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 14/104,447

(22) Filed: Dec. 12, 2013

(65) Prior Publication Data

US 2014/0109032 A1    Apr. 17, 2014

Related U.S. Application Data

(62) Division of application No. 13/531,533, filed on Jun. 23, 2012, now Pat. No. 8,782,585.

(60) Provisional application No. 61/502,635, filed on Jul. 13, 2011.

(51) Int. Cl.
  *G06F 17/50* (2006.01)

(52) U.S. Cl.
  CPC ........ *G06F 17/5072* (2013.01); *G06F 2217/14* (2013.01); *G06F 17/5009* (2013.01); *G06F 2217/78* (2013.01); *G06F 2217/16* (2013.01); *G06F 2217/12* (2013.01); *G06F 2217/80* (2013.01); *G06F 17/5081* (2013.01)
  USPC ........... 716/122; 716/112; 716/123; 716/129; 716/130; 716/132; 716/136; 703/16

(58) Field of Classification Search
  CPC . G06F 17/5081; G06F 17/5009; G06F 17/17; G06F 2217/12; G06F 2217/14; G06F 2217/16; G06F 2217/80; G06F 2217/78; G06F 17/5072
  USPC ......... 716/112, 122, 123, 129, 130, 132, 136; 703/16
  See application file for complete search history.

(56) References Cited

U.S. PATENT DOCUMENTS

| | | | | |
|---|---|---|---|---|
| 5,461,576 | A * | 10/1995 | Tsay et al. | 716/113 |
| 5,535,134 | A * | 7/1996 | Cohn et al. | 716/112 |
| 5,818,729 | A * | 10/1998 | Wang et al. | 716/122 |
| 6,057,169 | A | 5/2000 | Singh et al. | |
| 6,058,257 | A | 5/2000 | Nojima et al. | |
| 6,317,863 | B1 * | 11/2001 | Segal | 716/122 |
| 6,415,426 | B1 * | 7/2002 | Chang et al. | 716/113 |
| 6,457,157 | B1 | 9/2002 | Singh et al. | |
| 6,802,050 | B2 | 10/2004 | Shen et al. | |
| 6,931,610 | B1 * | 8/2005 | Buch et al. | 716/113 |
| 7,047,163 | B1 * | 5/2006 | Chakraborty et al. | 703/2 |
| 7,089,521 | B2 * | 8/2006 | Kurzum et al. | 716/122 |

(Continued)

FOREIGN PATENT DOCUMENTS

JP    04137761    5/1992

*Primary Examiner* — Phallaka Kik
(74) *Attorney, Agent, or Firm* — Adam W. Bell; Matthew Rupert Kaser

(57) ABSTRACT

Methods and systems for improving the reliability of C4 solder ball contacts performed at the design stage to reduce the incidence of thermally-induced failures, including those due to electromigration and thermal cycling.

10 Claims, 3 Drawing Sheets

(56) References Cited

U.S. PATENT DOCUMENTS

| | | | |
|---|---|---|---|
| 7,266,796 B1* | 9/2007 | Chu et al. | 716/123 |
| 7,389,208 B1* | 6/2008 | Solinsky | 703/2 |
| 7,454,724 B2 | 11/2008 | Kurihara et al. | |
| 7,802,220 B1* | 9/2010 | Popovich et al. | 716/120 |
| 7,962,877 B2* | 6/2011 | Keinert et al. | 716/119 |
| 7,966,595 B1* | 6/2011 | Chong et al. | 716/118 |
| 8,234,615 B2* | 7/2012 | Ramji et al. | 716/129 |
| 8,352,230 B2* | 1/2013 | Kim et al. | 703/13 |
| 8,484,594 B2* | 7/2013 | Kucar et al. | 716/110 |
| 8,572,540 B2* | 10/2013 | Chong et al. | 716/118 |
| 2005/0166169 A1* | 7/2005 | Kurzum et al. | 716/10 |
| 2009/0077508 A1* | 3/2009 | Rubin et al. | 716/4 |
| 2010/0224311 A1* | 9/2010 | Blessing et al. | 156/209 |
| 2011/0107283 A1 | 5/2011 | Oh et al. | |
| 2011/0224951 A1* | 9/2011 | Kim et al. | 703/1 |
| 2011/0239177 A1* | 9/2011 | Chong et al. | 716/119 |
| 2012/0036491 A1* | 2/2012 | Ramji et al. | 716/122 |

* cited by examiner

SYSTEMS AND METHODS FOR INTEGRATED CIRCUIT C4 BALL PLACEMENT

RELATIONSHIP TO OTHER APPLICATIONS

To the extent allowed by law this application claims priority to and the benefit of U.S. application Ser. No. 13/531,533 entitled "METHODS FOR INTEGRATED CIRCUIT C4 BALL PLACEMENT", filed 23 Jun. 2012 which itself claims priority to U.S. provisional application No. 61/502,635 entitled "METHODS FOR INTEGRATED CIRCUIT C4 BALL PLACEMENT," filed on Jun. 29, 2011 by inventors Dr. Matthew Guthaus and Sheldon Logan. That application is hereby incorporated by reference to the fullest extent allowed by law.

FIELD OF THE INVENTION

The presently disclosed subject matter is directed towards a system and method of locating C4 balls on VLSI integrated circuits that reduces thermal expansion-induced problems.

BACKGROUND OF THE INVENTION

Modern electronic devices often incorporate densely populated circuit boards, very large scale integrated (VLSI) chips, and other semiconductor devices and support elements such as resistors, inductors, capacitors, and connectors. For proper operation all of the devices must reliably electrically interconnect using electrical contacts.

While the foregoing scheme has proven highly successful, it has issues. For example, as VLSI and other semiconductor devices have evolved they have become extremely densely populated with internal circuitry, an evolution that tends to increase the number of input/output (I/O) lines required per device. While increasing the number of I/O lines can and has increased the data transfer and processing speeds of devices, it is disadvantageous because as the number of I/O lines increase more electrical contacts are required per unit board area. This mandates smaller electrical contacts, reduced spacing between electrical contacts, and smaller conductors.

Prior art semiconductor devices were comprised of one or more silicon dies that were fabricated with numerous transistors, gates, and metallic pads that were bonded to a substrate. The substrate had pin connectors that passed through the substrate's outer periphery. Internally, the pin connectors usually had a flat bond area. Fine wires where wire bonded between metallic pads on the silicon dies and the flat bond areas of the pin connectors. The substrate was then attached to a circuit board by having its pin connectors electrically connect to circuit board conductors. While very successful, this technique is inherently limited because only a limited number of pin connectors can be placed around the substrate. As circuit densities increase the inherent placement limitation became a serious problem.

Over the years various approaches have been taken to increase the number of electrical contacts per silicon dies. Many of those approaches had serious problems in aligning the electrical contacts of the silicon dies with the electrical contacts of the circuit boards substrates. However, one highly successful approach to increasing electrical contact density that avoids undue alignment problems is the so called flip-chip approach that uses Controlled Collapse Chip Connections, also known as C4.

C4 electrical contacts use "solder bumps," also known as "solder balls," that are formed on a silicon die's metallic pads. The solder ball pattern is designed to electrically connect to similarly positioned flat contacts on a substrate, circuit board, or other die receiver.

After the solder balls are formed a silicon die that die is flipped over and positioned on the flat contacts. The flat contacts, silicon die, and solder balls are then heated to melt the solder. After the solder cools a reliable electrical and mechanical bond is ideally formed between the solder balls and the flat contacts. This description is highly simplified in that the complex and important steps of placement, cleaning, flux use, heating profiles, cooling profiles, and solder compositions are ignored. However, when properly implemented the flip chip approach with its C4 balls have proven extremely useful in increasing electrical contact densities.

Using C4 ball electrical connections have several major advantages beyond the increased number of electrical connections that can be implemented per unit area. One is that the high surface tensions of solders make C4 electrical connections self-aligning. If a semiconductor device is not perfectly aligned with the flat contacts, as the solder melts the solder surface tension causes physical movement of the silicon die that causes the solder bums and flat contacts to align.

C4 solder balls are typically about 100 microns in diameter. While very small, decreasing the solder ball size would enable a further increase in the number and density of electrical connections. However, as the solder balls get smaller electrical reliability problems increase. One major set of problems result from the thermal environment that C4 solder balls can experience during the lifetime of the silicon die. Thermal cycling creates mechanical stresses because of Coefficient of Thermal Expansion (CTE) mismatches between substrate materials, receiver materials (circuit boards, other substrates, etc), silicon dies, metallic pads, flat contacts, and solders, all of which induce stress cracks that can and have lead to device failure.

Another temperature related failure mechanism when using C4 solder ball electrical connections is a result of electromigration. Electromigration is the transport of material by conductor ions due to momentum transfer between conducting electrons and metal atoms. As C4 balls get smaller the electron current densities in the C4 balls increase, which increases metal transport from the C4 balls, which results in various failure mechanisms (metal thinning and voiding, amalgamations, fracturing, hillock failures, etc).

Both electromigration and thermal cycling failures are exacerbated by high temperatures and temperature cycling. Such thermal stress induced failures increase as temperature changes rates increase, the temperature change span increases, and as the number of thermal cycles increase.

Numerous approaches have been made to reduce and hopefully eliminate thermally induced failures of C4 bonds. One approach is to increase the diameter of the C4 bonds, but this decreases and limits the number of possible I/O connections, which is contrary to why flip-chip bonding with its C4 bonds are being used. Other approaches, such as incorporating heat sinks, inserting an additional connection layer to relieve CTE mismatches, attempting to better match CTEs of the various materials, have usually proven unsuccessful either because of additional fabrication complexity; an increase in the number of connections, each of which has its own failure rate, fails to improve reliability; or suitable materials are either unavailable, too costly, or are not conducive with current fabrication technology. Thus the thermally induced failure problems of flip-chip C4 solder ball contacts have not been solved.

In view of the foregoing what is needed is a system and a method of reducing thermally induced failures when using C4 solder ball contacts. Beneficially, such a system and method would not involve increasing C4 solder ball contacts diameters or adding more connections. Even more beneficial, to leverage existing technology and materials, preferably the system and method would not require either new or additional fabrication steps or materials.

BRIEF SUMMARY OF THE INVENTION

The principles of the present invention enable systems and methods of improving the reliability of C4 solder ball contacts by reducing the incidence of thermally-induced failures. Beneficially, the principles of the present invention can be implemented such that larger C4 solder ball contacts, additional connections, new or additional fabrication steps, and/or new materials are not required.

A first system and method implements a multi-step C4 ball placement layout technique well suited for implementation at the computer aided design (CAD) layout level. That system and method implements a "stress aware" approach to C4 ball placement and incorporates a quadratic wirelength optimization technique that enables C4 ball placements that minimize wire lengths while enabling a reduced thermally-induced failure rate. The first system and method begins by calculating the optimal position of C4 solder balls using a quadratic optimization technique. Then, a grid map of all possible C4 ball locations is produced based on the minimum pitch distance for the C4 ball being used, and the length and width of the semiconductor chip. The thermal stress on a C4 ball at each possible C4 ball locations is then found using a temperature map that is generated from the grid map. Next, the thermal failure rate is calculated for each C4 ball location based on calculated stresses, creep rates, and number of cycles to failure rates for the C4 balls. All possible ball locations that have a reliability threshold lower than a predetermined value are then removed. Finally, each of the remaining possible C4 ball locations is "legalized."

Legalization is a special term to identify "good" C4 ball locations. Legalization is performed by first assigning a C4 ball to each of the remaining (not removed from the grid map) possible C4 ball locations. Then, for each of the assigned C4 balls the number of other C4 balls that are closest to that assigned C4 are tabulated and placed in memory "bins." The possible C4 ball locations are then sorted based on the number in each memory bin for each of the possible C4 ball locations such that the C4 ball with the largest number in the bin is first. Finally, a set of C4 ball locations is determined wherein the set is found by greedily placing the sorted C4 balls as close to their optimal locations as possible by avoiding overlaps with both other possible C4 balls and with the C4 ball locations that were removed because of low reliability.

A second system and method also implements a multi-step C4 ball placement layout technique that is well suited for implementation at the computer aided design (CAD) layout level. The second system and method places C4 power balls so as to reduce thermal problems that are related to electromigration. The second system and method begins by first converting a circuit to be implemented into a weighted graph G(V,E), where V represents the nodes of the circuit and E represents the conductors between the nodes. The weight of the $i^{th}$ node ($w(v_i)$) is the current source at the node ($I_i$) while the weight of the $i^{th}$ edge ($w(e_i)$) is the conductance of the conductor between the nodes connected by that edge.

The next step is finding the minimum number of balls (Nm) that satisfies a current draw constraint ($I_{thres}$) that is selected to mitigate electromigration problems. That number Nm is beneficially calculated from the total current ($I_{total}$) required by the circuit being laid out divided by the current draw constraint $I_{thres}$. Next, the circuit is partitioned into sub-circuits such that the sum of the current sources in each sub-circuit is less than the current draw constraint ($I_{thres}$). A determination is then made as to a) whether the supply current is sent only to transistor within its partition, and b) if the IR drop in that partition is minimized. If not, the number Nm is increased by K (an integer) and a loop is made back to partition the circuit with the new Nm.

When a determination is made that with the given Nm that the supply current is sent only to transistors within each partition, and the IR drop in each partition is minimized, a binary search between Nm and Nm–k balls is performed to obtain an optimal solution. The C4 balls are then placed in the optimal partitions to satisfy the IR drop constraint.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter now will be described more fully hereinafter with reference to the accompanying drawings in which two embodiments are shown. However, it should be understood that this invention may take many different forms and thus should not be construed as being limited to the embodiments set forth herein. In the figures like numbers refer to like elements throughout.

All publications mentioned herein are incorporated by reference for all purposes to the extent allowable by law. In addition, in the figures like numbers refer to like elements throughout. Additionally, the terms "a" and "an" as used herein do not denote a limitation of quantity, but rather denote the presence of at least one of the referenced items.

Figure 1:
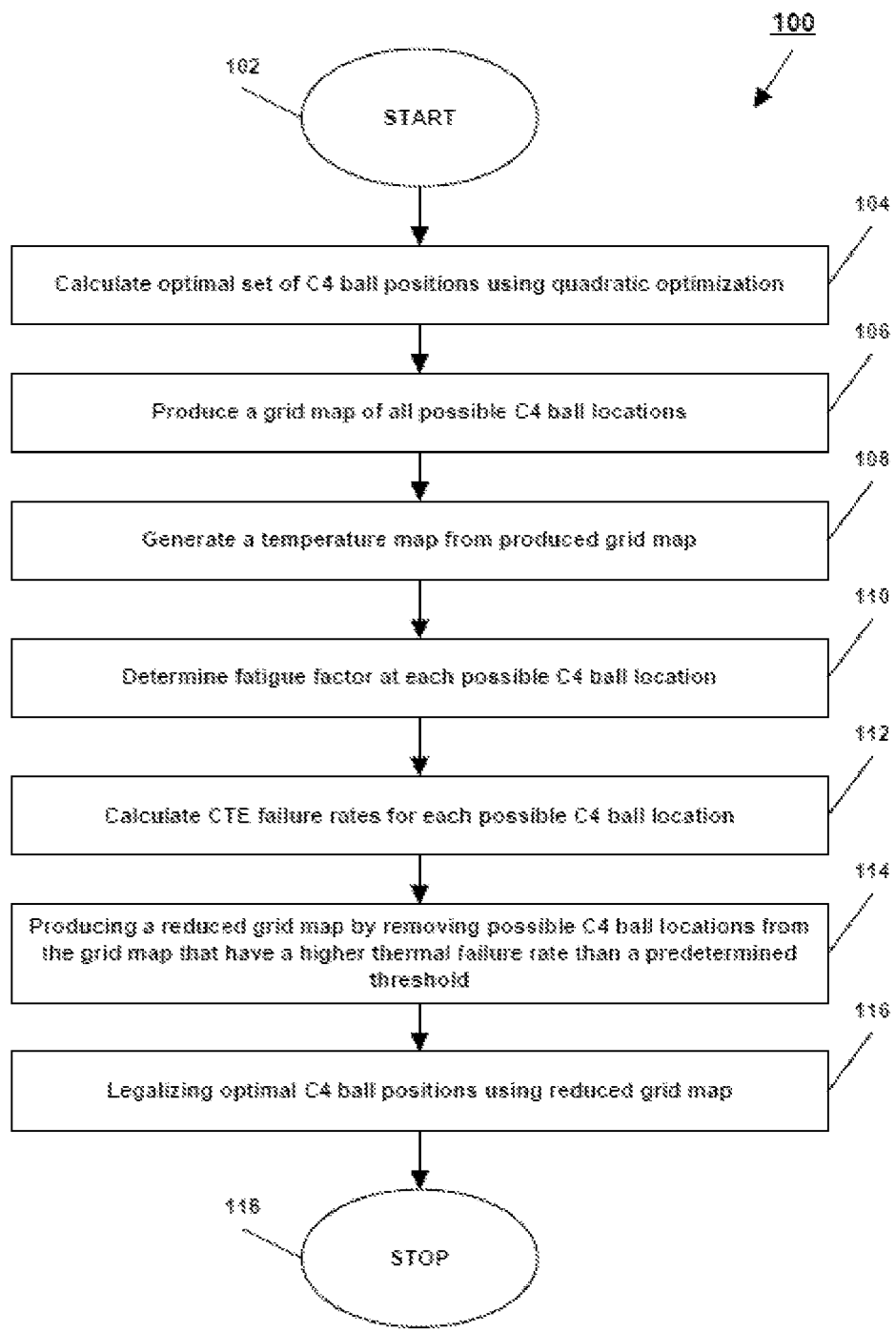
FIG. 1 is a block diagram of a method of locating C4 balls that incorporates a quadratic wavelength optimization technique.
Figure 2:
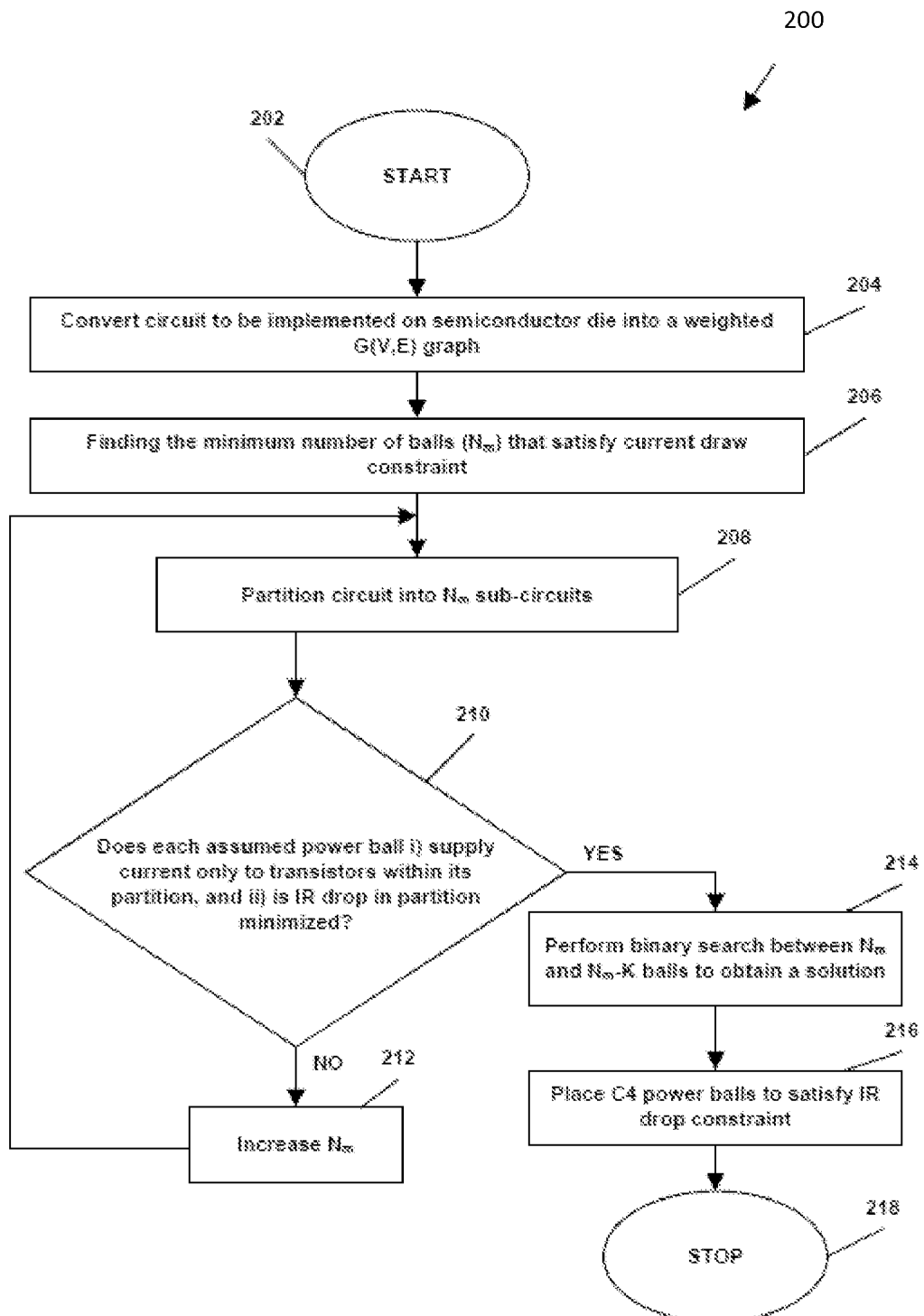
FIG. 2 is a block diagram of a method of locating power plane C4 balls.

The present invention is described herein with reference to FIGS. 1 and 2. Specifically, the principles of the present invention relate to locating C4 balls on a semiconductor die during the design layout stage, which will in practice be done using a CAD layout package.

FIG. 1 illustrates a first method 100 of locating C4 balls which is "stress aware" in that thermally induced stresses are taken into consideration when determining where the C4 balls are located. The method 100 is well suited for implementation at the computer aided design (CAD) layout level. Method 100 also incorporates a quadratic wire length optimization technique, described in more detail subsequently, that enables C4 ball placements that minimize wire lengths while also enabling a reduced thermally induced failure rate.

As shown in FIG. 1, the method 100 starts at step 102. As the method 100 is beneficially implemented as part of a larger CAD layout program step 102 might be programmatically entered as a sub-routine or procedure of the larger CAD program. But, it is possible that the method 100 might be implemented as a "stand-alone" program. In that case step 102 would then be entered by running the stand-along program.

After step 102 the method 100 proceeds by calculating an optimal set of C4 ball locations on the semiconductor die using a quadratic optimization technique, step 104. This is performed by solving the following quadratic program:

$$\min \frac{1}{2} \sum_{i}^{n} \sum_{j}^{m} w_{ij}(px_i - bx_j)^2 + (py_i - by_j)^2$$

where $w_{ij}$ is the weight of the connection between block j and ball i obtained from the device netlist, n is the number of electrical contacts, m is the number of blocks, $px_i$ and $py_i$ are the x and y coordinates of ball i, and $bx_j$ and $by_j$ are the x and y coordinates of block j.

After the optimal pin locations have found at step 104, a grid map of all possible C4 ball locations is produced, step 106. That grid map is based on the minimum pitch distance for the C4 balls and on the length and width of the semiconductor die (chip).

Once the grid map has been created at step 106 one design goal is to determine the CTE failure rate at each possible C4 ball location. To do that, a temperature map of the semiconductor die is generated from the produced grid map, step 108. Then, based on the generated temperature map, a fatigue factor is determined at each possible C4 ball location, step 110. The fatigue factor depends on calculated stresses, creep rates, and number of cycles to failure rates for the C4 balls.

Given the temperature map from step 108 and the fatigue factors from step 110, the failure rate due to CTE mismatches between the substrate and the semiconductor die at each possible C4 ball location is determined, step 112.

Based on the failure rate at each possible C4 ball location that was obtained in step 112 a reduced grid map is produced by removing all possible ball locations that have a low reliability threshold from the grid map of all possible C4 ball locations (see step 106), step 114. One approach to do this is to specifying a minimum number of cycles to failure for all balls in the design and to then remove all possible ball locations with a value below the specified value. Another approach is to specifying a number of possible ball locations (N) that will not be used and then the N possible ball locations with the lowest number of cycles to failure are removed. Whatever approach is taken the reduced grid map is obtained by taking into consideration one or more stress factors that cause CTE failures. The possible C4 ball locations in the reduced grid map produced in step 114 are in some sense "better" than those not in the reduced grid map.

After production of the reduced grid map the optimal ball positions determined using quadratic optimization in step 104, are "legalized" in step 116. Legalization is the process of finding the best C4 ball locations to use. Legalization is performed by assigning C4 balls to a subset of the optimal ball positions found in step 104 wherein an optimal ball is placed in that subset if the optimal ball position is in the reduced grid map produced in step 114 and if the optimal ball positions avoids overlap with other C4 balls and the ball locations not in the reduced grid map.

Producing the subset of optimal ball positions is beneficially performed as follows. For each possible C4 ball location the number of optimal C4 balls closet to that location is tabulated and placed in a possible ball location bin. The possible ball location bins are then sorted so that the possible ball location bin with the largest number of balls is selected first. Finally, for each possible ball location bin the balls are greedily places as close to its optimal location, avoiding overlaps with other C4 ball locations and the locations that have been removed for reliability issues.

The C4 ball locations chosen to receive C4 are the ones that have be legalized. The process then stops at step 118.

FIG. 2 illustrates a second method 200 of locating C4 balls which is "stress aware" in that thermally induced stresses are taken into consideration when determining where the C4 balls are located. The method 200 is also well suited for implementation at the computer aided design (CAD) layout level. Specifically, method 200 places C4 power balls in locations so as to reduce thermal problems that are related to electromigration.

Method 200 starts at step 202. As the method 200 is beneficially implemented as part of a larger CAD layout program step 202 might be programmatically entered as a sub-routine or procedure of the larger CAD program. But, it is possible that the method 200 might be implemented as a "stand-alone" program. In that case step 202 would then be entered by running the stand-along program.

Method 200 proceed by converting a circuit that is to be implemented on a semiconductor die into a weighted graph G(V,E), step 204. In that graph V represents the nodes of the circuit and E represents the conductors between the nodes. The weight of the $i^{th}$ node ($w(v_i)$) is the current source at the node ($I_i$) while the weight of the $i^{th}$ edge ($w(e_i)$) is the conductance of the conductor between the nodes connected by that edge.

The next step is finding the minimum number of balls ($N_m$) that satisfies the current draw constraint ($I_{thres}$), step 206. The current draw constraint $I_{thres}$ is a value that is selected to reduce electromigration problems. The number $N_m$ is calculated by dividing the total current ($I_{total}$) required by the circuit being laid out by the current draw constraint $I_{thres}$:

$$N_m = \frac{I_{total}}{I_{thres}}$$

The $N_m$ value calculated in step 206 represents an initial computational value that can and likely will change subsequently.

Next, the circuit is partitioned into $N_m$ sub-circuits such that the sum of the current sources in each sub-circuit is less than the current draw constraint ($I_{thres}$), step 208. Each sub-circuit is assumed to include a C4 power ball.

With the circuit being laid out partitioned into $N_m$ sub-circuits such that the sum of the current sources in each sub-circuit is less $I_{thres}$ a check is made as to whether each assumed C4 power ball a) supplies current only to transistors within its partition, and b) the IR drop in its partition is minimized, step 210. If either of the foregoing criteria is violated the number of sub-circuits $N_m$ is increased by K, step 212. A typical value of K might be 10, but the actual value would depend on the circuit being laid out, on the computational speed of the CAD system, and on the time available to run the C4 power ball layout routine. After step 212 a loop is made back to step 208.

However, if in step 210 each assumed power ball supplies current only to transistors within its partition and all IR drops in each partition is minimized, a binary search between $N_m$ and $N_m$-K balls is performed to find a solution that does not violate the current constraint, step 214. Then a greed method is employed to place C4 power balls to satisfy the IR drop constraint, step 216 and then the method 200 stops, step 218.

The method 200 considers Mean time to Failure (MTTF) based on electromigration by adjusting the weighs of the nodes by temperature. Consequently instead of balancing the currents within each partition the method balances the electromigration within the C4 balls of each partition.

Figure 3:
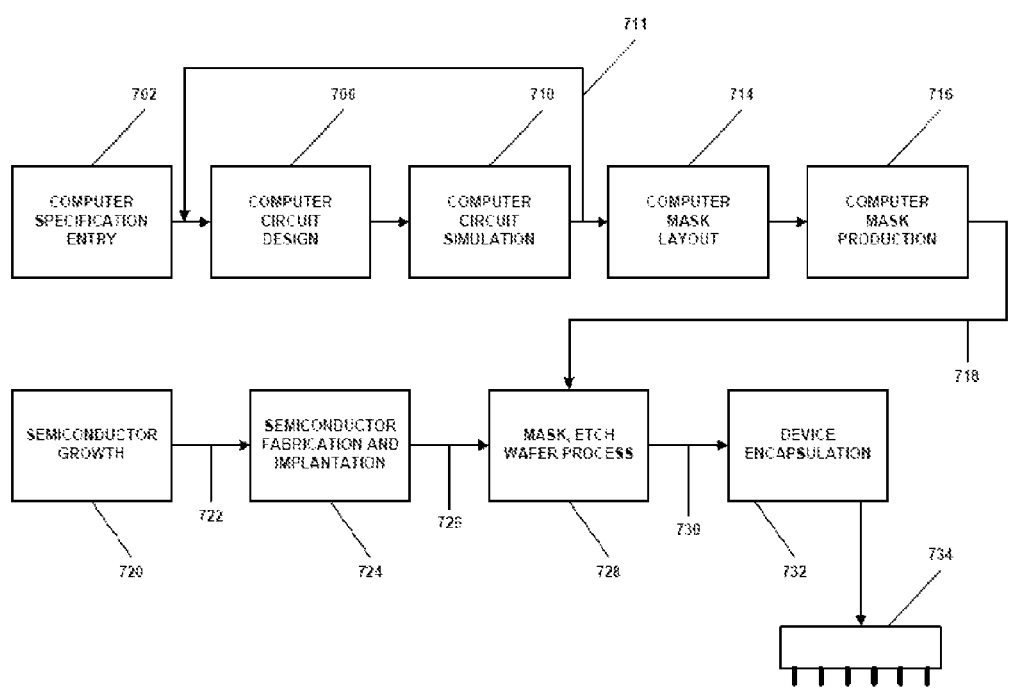
FIG. 3 illustrates the fabrication of an integrated circuit in accord with the principles of the present invention.

The technique for locating C4 balls is implemented in a computerized system that works in conjunction with other processes to produce an integrated circuit. FIG. 3 illustrates how the present invention can be used in the computerized system. There are three main processes that come into play. First entering device specifications, implementing a circuit design using the present invention, and then producing a wafer mask suitable for fabricating semiconductor devices. Second, growing a semiconductor ingot and processing it to a wafer ready for device fabrication. Finally fabricating an integrated circuit using the produced wafer mask and the wafer and then cutting the wafer to produce an IC chip which is encapsulated as an integrated circuit. Each individual function is complex, but except for incorporating the present invention to accomplish the required tasks, all are well known and have been used for many years.

The first set of fabrication actions begin with an operator entering specification data on an input terminal 702. Specification data is entered in the proper format to describe the performance of the desired integrated circuit. With the specifications fully entered a computer 706 implements a circuit design, including locating C4 balls as described above. During circuit design a computer 710 simulates the circuit being designed to ensure that it will meet the design specifications. The process of having a computer or computers design and simulate the circuit reiterates 711 until the circuit being designed fulfills the design specifications.

After the circuit having C4 balls located as described above has been designed a computer 714 performs a mask lay out. That is, the computer 714 accepts the final circuit design and converts that circuit design into a physical layout of an integrated circuit mask that will be used in later stages to produce the integrated circuit. After mask layout is complete a computer 716 controls the production of a mask, represented by line 718.

Meanwhile, the second set of production functions has been ongoing. First a semiconductor is grown in a semiconductor production facility 720 to produce a semiconductor ingot, represented by line 722. That ingot 722 is sent to a Semiconductor fabrication and implantation facility 724 where the ingot 722 is diced into wafers, polished, and ion implanted to produce a wafer 726. The wafer 726 is then fabricated to retain a plurality of individual integrated circuit devices using the mask 718. Thus the present invention is physically incorporated into integrated circuit devices. The wafer with its individual integrated circuit devices, represented by line 730, is then sent to a device encapsulation plant 732 where the wafer 730 is cut into individual integrated circuits 734 which are then encapsulated for subsequent use.

The end result of this complex process is an individual integrated circuit 734 that benefits from and that incorporates the principles of the present invention.

Therefore, it is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed is:

1. A method of laying out C4 ball placements, comprising using a computer to perform the following steps:
   (i) calculating optimal position of C4 solder balls on a chip using a quadratic optimization technique;
   (ii) producing a grid map of all possible C4 ball locations based on a minimum pitch distance for the C4 balls and a length and width of the chip;
   (iii) generating a temperature map from the produced grid map;
   (iv) determining thermal stress on a C4 ball at each possible C4 ball location in the grid map by using the temperature map;
   (v) calculating a thermal failure rate for each possible C4 ball location based on thermal stresses, creep rates, and number of cycles to failure rates for the C4 balls;
   (vi) producing a reduced grid map by removing all possible C4 ball locations from the grid map that have a higher thermal failure rate than a predetermined threshold;
   (vii) legalizing possible C4 ball locations in the reduced grid map so as to generate bin entries;
   (viii) sorting possible C4 ball locations based on bin entries; and
   (ix) locating a set of C4 ball locations within the reduced grid map using bin entries such that overlaps between other C4 ball locations and removed C4 ball locations are avoided.

2. The method according to claim 1, wherein the step of calculating the optimal position of C4 solder balls includes receiving a device netlist having a number of electrical contacts and wherein said quadratic optimization technique includes solving the following quadratic equation:

$$\min \frac{1}{2} \sum_i^n \sum_j^m w_{ij}(px_i - bx_j)^2 + (py_i - by_j)^2$$

wherein wij is a weight of a connection between block j and ball i obtained from the device netlist, n is a number of electrical contacts, m is a number of blocks, pxi and pyi are x and y coordinates of ball i, and bxi and byi are x and y coordinates of block j.

3. The method according to claim 1, wherein the step of producing a reduced grid map is performed by receiving a minimum number of cycles to failure for all balls in the placements and to removing all possible ball locations with a value below the received number of cycles.

4. The method according to claim 1, wherein the step of producing a reduced grid map is performed by receiving a number (N) of possible ball locations that will not be used and removing N ball locations having the lowest number of cycles to failure.

5. The method according to claim 1, wherein the step of legalizing possible C4 ball locations is performed by assigning C4 balls to a subset of the optimal ball positions, wherein an optimal ball is placed in that subset if the optimal ball position is in the reduced grid map and if the optimal ball positions avoids overlap with other C4 balls and the ball locations not in the reduced grid map.

6. A method for laying out C4 ball placements, the method comprising using a computer to perform the following steps:
   (i) inputting into the computer specifications regarding a length and width of a semiconductor device to receive C4 balls;

(ii) inputting into the computer a device netlist having a number of electrical contacts to be implemented;
(iii) inputting into the computer a minimum number of cycles to failure for C4 solder balls;
(iv) operating the computer to calculate an optimal position of C4 solder balls using a quadratic optimization technique;
(v) generating a grid map of all possible C4 ball locations based on a minimum pitch distance for the C4 balls and the length and width of the semiconductor device;
(vi) generating a temperature map from the generated grid map;
(vii) operating the computer to calculate the thermal stress on a C4 ball at each possible C4 ball location in the grid maps by using the temperature map;
(viii) operating the computer to calculate a thermal failure rate for each possible C4 ball location based on thermal stresses, creep rates, and number of cycles to failure rates for the C4 balls;
(ix) generating a reduced grid map by removing all possible C4 ball locations from the grid map that have a higher thermal failure rate than a predetermined threshold;
(x) computationally legalizing possible C4 ball locations in the reduced grid map so as to generate bin entries;
(xi) sorting possible C4 ball locations based on bin entries; and
(xii) using the computer to locate a set of C4 ball locations on the semiconductor device and within the reduced grid map using bin entries such that overlaps between other C4 ball locations and removed C4 ball locations are avoided.

7. The method according to claim 6, wherein the step of calculating the optimal position of C4 solder balls includes having a computer solve the following quadratic equation:

$$\min \frac{1}{2} \sum_{i}^{n} \sum_{j}^{m} w_{ij}(px_i - bx_j)^2 + (py_i - by_j)^2$$

wherein $w_{ij}$ is a weight of a connection between block j and ball i obtained from the device netlist, n is a number of electrical contacts, m is a number of blocks, $px_i$ and $py_i$ are x and y coordinates of ball i, and $bx_i$ and $by_i$ are the and y coordinates of block j.

8. The according to claim 6, wherein producing a reduced grid map is performed by removing all possible ball locations with a value below the received number of cycles.

9. The method according to claim 6, wherein computationally producing a reduced grid map is performed by inputting into a computer a number (N) of possible ball locations that will not be used and then removing N ball locations having the lowest number of cycles to failure.

10. The method according to claim 6, wherein computationally legalizing possible C4 ball locations is performed by computationally assigning C4 balls to a subset of the optimal ball positions, wherein an optimal ball is placed in that subset if the optimal ball position is in the reduced grid map and if the optimal ball positions avoids overlap with other C4 balls and the ball locations not in the reduced grid map.

* * * * *